(12) United States Patent
Yang et al.

(10) Patent No.: US 9,136,564 B2
(45) Date of Patent: *Sep. 15, 2015

(54) BATTERY PACK SYSTEM AND LIQUID LEAKAGE DETECTION METHOD THEREOF

(71) Applicant: Microvast Power Systems Co., Ltd., Huzhou, Zhejiang (CN)

(72) Inventors: Congming Yang, Zhejiang (CN); Zhiming Tong, Zhejiang (CN); Xiang Li, Zhejiang (CN)

(73) Assignee: Microvast Power Systems Co., Ltd., Huzhou, Zhejiang (CN)

( * ) Notice: Subject to any disclaimer, the term of this patent is extended or adjusted under 35 U.S.C. 154(b) by 182 days.

This patent is subject to a terminal disclaimer.

(21) Appl. No.: 13/742,375

(22) Filed: Jan. 16, 2013

(65) Prior Publication Data

US 2013/0183552 A1 Jul. 18, 2013

(30) Foreign Application Priority Data

Jan. 16, 2012 (CN) .......................... 2012 1 0012241

(51) Int. Cl.
| | |
|---|---|
| *H01M 10/0567* | (2010.01) |
| *H01M 10/42* | (2006.01) |
| *H01M 2/10* | (2006.01) |
| *H01M 10/48* | (2006.01) |
| *H01M 10/0525* | (2010.01) |

(52) U.S. Cl.
CPC ........ *H01M 10/4235* (2013.01); *H01M 2/1077* (2013.01); *H01M 10/4228* (2013.01); *H01M 10/482* (2013.01); *H01M 10/484* (2013.01); *H01M 10/0525* (2013.01); *H01M 10/488* (2013.01); *Y02T 10/7011* (2013.01)

(58) Field of Classification Search
CPC ..................... H01M 10/5059; H01M 10/4235; H01M 10/0567; H01M 2/1077
USPC .......................................................... 429/51
See application file for complete search history.

(56) References Cited

U.S. PATENT DOCUMENTS

| | | | | |
|---|---|---|---|---|
| 2005/0269995 | A1* | 12/2005 | Donnelly et al. | 320/150 |
| 2011/0064997 | A1* | 3/2011 | Peskar et al. | 429/185 |
| 2011/0262793 | A1* | 10/2011 | Reis et al. | 429/120 |

* cited by examiner

*Primary Examiner* — Stewart Fraser
*Assistant Examiner* — Olatunji Godo
(74) *Attorney, Agent, or Firm* — Winston Hsu; Scott Margo

(57) ABSTRACT

A battery pack system and a liquid leakage detection method thereof are provided. The battery pack system comprises battery cells, a isolated liquid and a battery box containing the isolated liquid. The battery cells are soaked in the isolated liquid. The battery box is formed with a isolated liquid outlet and a isolated liquid inlet. The outlet is connected together with the inlet via a circulation pump and a liquid separation device to form a circulation passage. When electrolyte leakage occurs to any of the battery cells, the electrolyte is separated into the liquid separation device and detected by a detection component. The present disclosure encloses the leaked electrolyte into the fire-retardant isolated liquid to prevent the electrolyte from contacting with the air so as to improve the safety of the battery box body.

16 Claims, 4 Drawing Sheets

BATTERY PACK SYSTEM AND LIQUID LEAKAGE DETECTION METHOD THEREOF

FIELD OF THE INVENTION

The present disclosure relates to a battery pack system and liquid leakage detection method thereof.

BACKGROUND OF THE INVENTION

Currently, battery-driven electric vehicle and electric buses are gradually replacing conventional vehicle and buses. Battery cells act as a main energy storage device in an electric vehicle. A battery box, as a device for containing the battery cells, is a key component of the electric vehicle, and has a direct influence on the performance of the battery cells and thus on the performance of the electric vehicle. As lithium-ion\batteries have advantages such as the excellent power output performance and a long service life, they have been widely applied in the electric vehicle.

The battery cells, as a main energy storage device in the electric vehicle, is generally consists of a plurality of batteries connected in series or in parallel. The batteries may be subject to liquid leakage after being used for a period of time due to defects or unreasonable installation and fixation structures of the batteries. The leaked electrolyte is a flammable organic material, and is easy to ignite due to sparks or electrostatic discharges when being exposed to the air. This will reduce the safety of the battery pack and endanger the vehicle.

The conventional practice is to detect the liquid leakage through gas detection. The detection principle is generally as follows: due to the battery box is a relatively hermetic space, some gases are often formed and released when the electrolyte is leaked from the battery pack, and these gases can be detected by a gas detector. If these gases are detected by the detector, it represents that an accident of leakage occurs to the battery pack. However, this detection method has some shortcomings: 1. the gas detector is relatively expensive, and cannot deliver a good detection effect when the concentration of the gases is relatively low; and 2. the gas detector cannot work effectively until the gases in the battery box reach a certain concentration and, at this time, a relatively large amount of the electrolyte has been leaked. Because the flammable electrolyte is exposed to the air, this makes accidents of fires and combustion likely to occur.

SUMMARY OF THE INVENTION

One objective of the present disclosure is to provide a safer battery pack system and liquid leakage detection method thereof.

To achieve the aforesaid objective, the present disclosure provides a battery pack system, which comprises a plurality of individual batteries, a isolated liquid and a battery box containing the isolated liquid. The battery cells are soaked in the isolated liquid, the battery box comprising a box body and a cover plate, and electrical connection components are disposed in the battery pack. The battery cells are placed upside down. The isolated liquid is a fire-retardant and insulating liquid that has a specific gravity smaller than an electrolyte and is insoluble in the electrolyte. The box body is formed with a isolated liquid outlet and a isolated liquid inlet. The isolated liquid outlet is connected together with the isolated liquid inlet via a circulation passage to form a path. A liquid separation device and a circulation pump are further disposed in the circulation passage. The liquid separation device is connected with a detection device. The detection device comprises at least one detection component and a reaction device. The liquid separation device, the reaction device and at least one detection component are connected in sequence. The electrical connection components are soaked in the isolated liquid, and the isolated liquid is one or both of silicone oil and transformer oil.

Preferably, a heat exchange device is further disposed in the circulation passage.

Preferably, at least one detection component is one or more of a conductivity sensor, a PH sensor, a fluorion selective electrode and a liquid-level refraction sensor.

To achieve the aforesaid objective, the present disclosure further provides a battery pack system, which comprises a plurality of battery cells, a isolated liquid and a battery box containing the isolated liquid. The battery cells are soaked in the isolated liquid. The battery box comprising a box body and a cover plate. Electrical connection components are disposed in a battery pack. The isolated liquid is a fire-retardant and insulating liquid that has a specific gravity smaller than an electrolyte and is insoluble in the electrolyte. The box body is formed with a isolated liquid outlet and a isolated liquid inlet. The isolated liquid outlet is connected together with the isolated liquid inlet via a circulation passage to form a path. A liquid separation device and a circulation pump are further disposed in the circulation passage. The liquid separation device is connected with a detection device; and the electrical connection components are soaked in the isolated liquid.

Preferably, the detection device comprises at least one detection component.

In another implementation, the detection device further comprises a reaction device, and the liquid separation device, the reaction device and at least one detection component are connected in sequence. This applies to a case where the electrolyte is separated by the liquid separation device and is transferred into the reaction device to chemically react with other substances so that detection is accomplished according to the reaction product.

When the electrolyte is leaked from any of the battery cells, the isolated liquid mixed with the leaked electrolyte is detected by at least one detection component when flowing through the liquid separation device, and the at least one detection component gives a feedback signal.

The liquid separation device is a device capable of separating the electrolyte from the isolated liquid, and is produced according to the principle that the electrolyte has a larger density than the isolated liquid and is insoluble in the isolated liquid.

The electrical connection components include a relay, a connection copper sheet, a current collector and/or other components for connecting the battery pack.

The electrical connection components are soaked in the isolated liquid in order to prevent an electric arc generated during operation of the electrical connection components from igniting flammable components in the box.

Preferably, a heat exchange device is further disposed in the circulation passage. The heat exchange device can dissipate heat from the battery pack or heat the battery pack. The heat exchange device mainly comprising heat exchange fins.

Preferably, the isolated liquid is one or both of silicone oil and transformer oil. The two materials are preferred because of the stable fire-retardant and insulating properties thereof.

Preferably, the at least one detection component is one or more of a conductivity sensor, a PH sensor, a fluorion selective electrode and a liquid-level refraction sensor. Any sensor may be used so long as it can give a feedback upon contacting with the electrolyte.

Preferably, the battery cells are placed upside down with electrode ends thereof facing a bottom surface. In the charging and discharging processes of the battery pack, a site experiencing the highest temperature is electrode tabs or the current collector. Placing the battery cells upside down allows for using as little as possible isolated liquid to achieve the purpose of completely immersing the electrode tabs into the isolated liquid, and this can effectively reduce usage of the isolated liquid while still satisfying the heat dissipation requirement.

Preferably, a bottom surface of each of the battery cells is fixed to the cover plate. This enables the battery pack to be fixed more securely.

Preferably, a support frame is disposed at the bottom of the battery box to support the battery cells overhead. This can prevent the electrode tabs of the battery cells from contacting with the bottom surface of the battery box and from being pressed down by the support frame. In this way, the battery pack can be fixed more reliably when being disposed upside down.

A lithium-ion battery uses an organic electrolyte as a conductive medium. If the electrolyte makes contact with oxygen in the air and a high temperature is generated by the battery pack in the discharging process, combustion and fires are likely to occur. The technical solution of the present disclosure can enclose the leaked electrolyte into the isolated liquid to prevent the electrolyte from contacting with the air, so no combustion is possible even in a high-temperature environment. This adequately guarantees the safety.

Preferably, each of the battery cells comprises a plurality of plate battery units, and an isolating component is disposed between each two of the plate battery units. Disposing the isolating component is favorable for isolating the battery cells to increase the fluidity of the isolated liquid and makes it easier for the leaked electrolyte to settle down. This arrangement is applicable to column batteries and other types of batteries.

Preferably, the isolating component is a knitmesh whose longitude lines and latitude lines are not within a same plane. The larger the spacing between the battery cells isolated by the knitmesh is, the more easily the liquid will flow. The longitude lines are vertical lines of the isolating component, and the latitude lines are transverse lines of the isolating component.

The present disclosure further provides a battery pack liquid leakage detection method. The battery pack liquid leakage detection method adopts the aforesaid battery pack system. The battery pack liquid leakage detection method comprises the following steps of: transferring the isolated liquid, in which the battery cells have been soaked, from the isolated liquid outlet to the circulation passage under the action of the circulation pump; when electrolyte leakage occurs to the battery cells in the battery box so that the electrolyte exists in the isolated liquid flowing into the circulation passage, separating the electrolyte into the liquid separation device disposed in the circulation passage; and detecting the separated electrolyte in the liquid separation device by the detection device.

Preferably, the step of detecting the separated electrolyte in the liquid separation device by the detection device comprises: detecting the separated electrolyte in the liquid separation device by the detection device, and prompting a driver for maintenance and replacement when a detected resistance value is smaller than a preset threshold due to increase of the concentration of the electrolyte.

Through the solutions of the present disclosure, the leaked electrolyte can be enclosed in the fire-retardant isolated liquid and thus prevented from contacting with the air to lead to risks of combustion; disposing the battery cells upside down in the battery box can reduce the amount of the isolated liquid needed, enhance the heat dissipation effect, decrease the cost and reduce the weight of the battery pack; immersing the electrical components into the isolated liquid can prevent the electrical components from contacting with the air to be aged or combusted; and detecting at the first time whether liquid leakage occurs to any of the battery cells in the battery box and sending an alert can improve the safety of the battery box.

DETAILED DESCRIPTION OF THE INVENTION

Hereinbelow, embodiments of the present disclosure will be described in detail with reference to the attached drawings.

Embodiment 1

Figure 1:
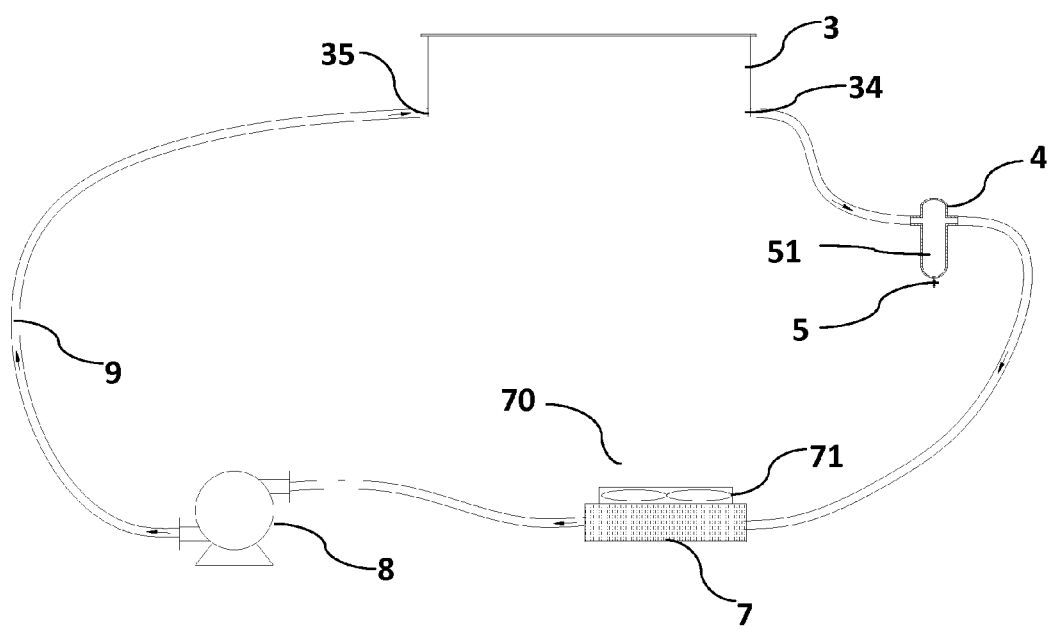
FIG. 1 is a schematic view of a battery pack.
Figure 2:
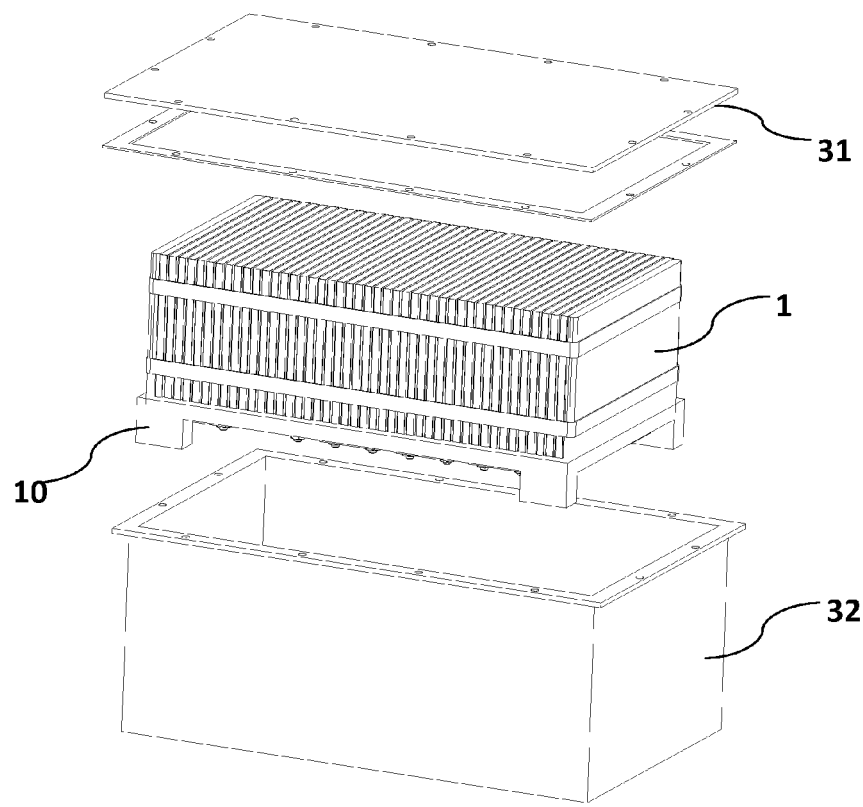
FIG. 2 is an exploded view of a battery box.
Figure 3:
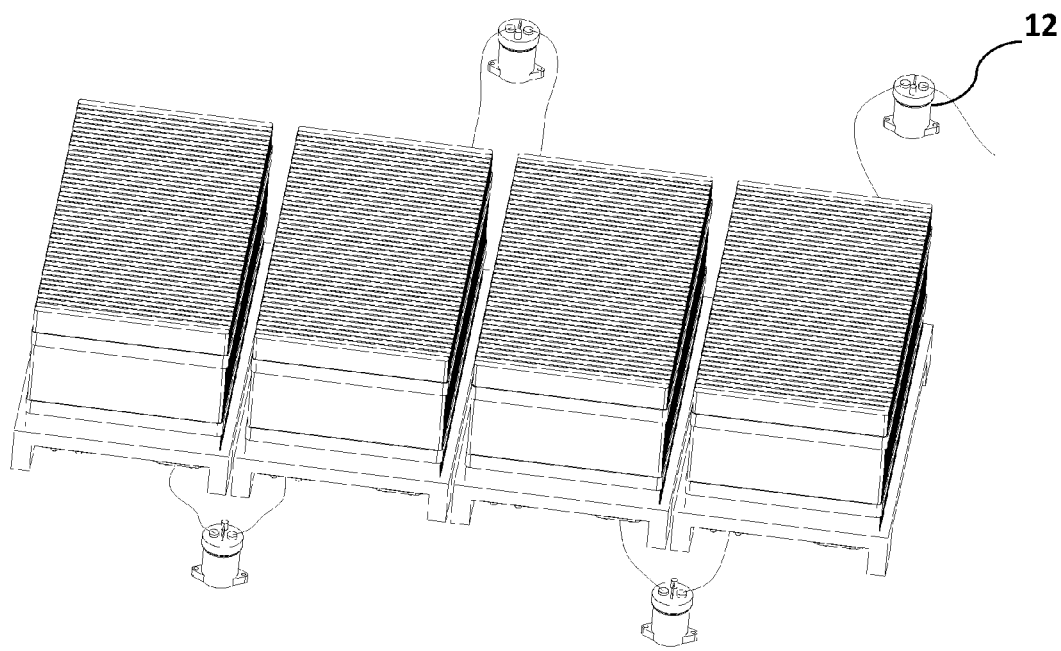
FIG. 3 is a schematic view of connections between battery cells and electrical connection components.
Figure 4:
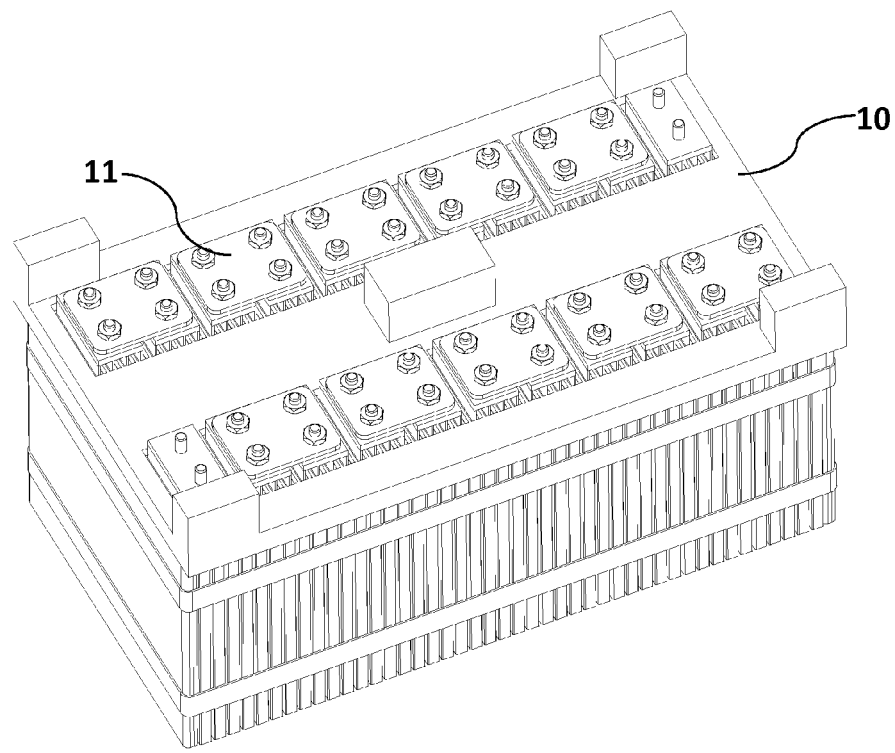
FIG. 4 is a schematic structural view of the battery cells combined with a support frame.
Figure 5:
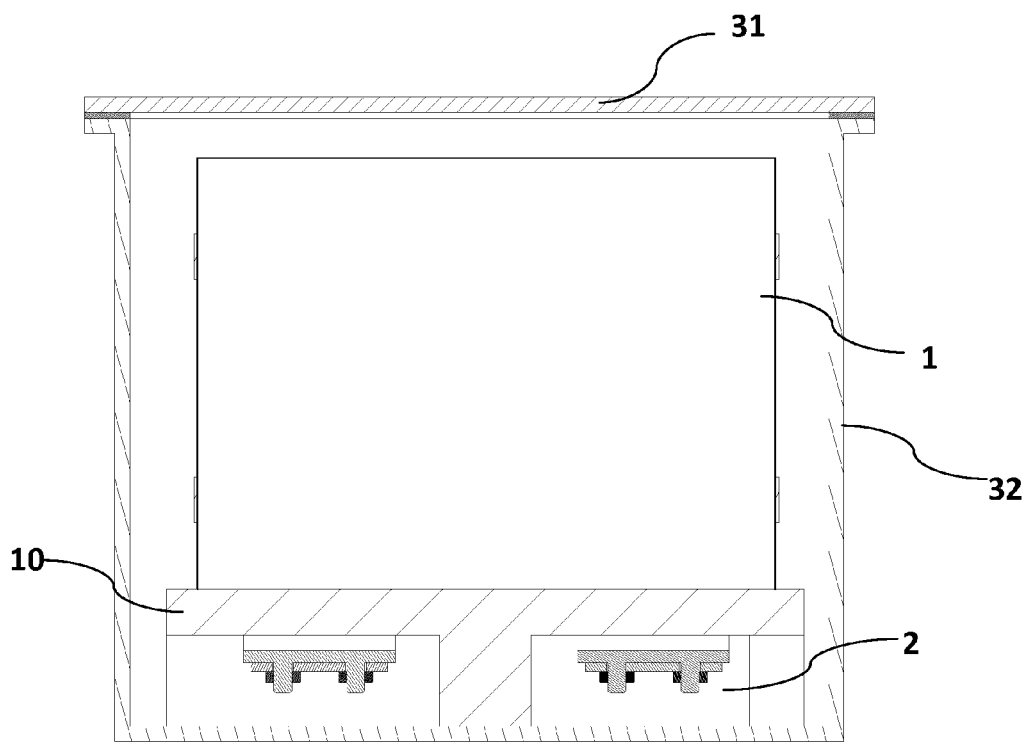
FIG. 5 is a side view of the battery box containing the battery cells.
Figure 6:
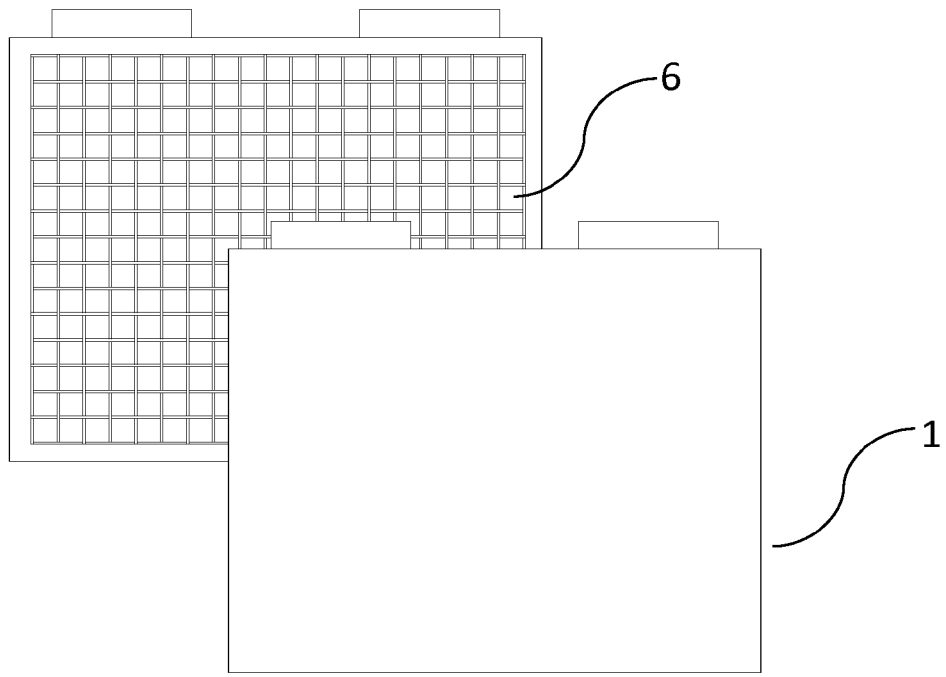
FIG. 6 is a schematic view of the battery cells combined with an isolating component.

As shown in FIG. 1, a battery box 3 comprising a box body 32 and a cover plate 31. Plate battery units are disposed in the box body 32, and each battery cells 1 is formed by a plurality of the plate batteries that are stacked together. An isolating component 6 is sandwiched between each two adjacent ones of the battery cells 1. In this embodiment, the isolating component 6 is a piece of plastic knitmesh whose longitude lines and latitude lines are not within a same plane, and the plastic knitmesh can isolate the battery cells 1 well and accelerate circulation of a isolated liquid 2 so that an electrolyte can flow into the isolated liquid 2 more easily. A metal knitmesh also be used as the isolating component 6, but it will affect the insulating capability of the whole system and is prone to be corroded by the electrolyte. Therefore, using the metal knitmesh will deliver a poor effect. It is also possible to use other knitmeshes having an excellent insulating performance. Electrical connection components 12 for connection to an external circuit are placed into the isolated liquid, and all the electrical connection components 12 in the battery pack are soaked in the isolated liquid 2.

A support frame 10 is disposed on a surface where electrodes 11 of the battery cells 1 are located, and then the battery cells 1 are placed upside down into the battery box 3. At this point, the electrodes 11 of the battery cells 1 are placed upside down downwards; i.e., a bottom surface of each of the battery cells is fixed to the cover plate 31. The support frame 10 supports the whole battery cells 1, and the isolated liquid 2 in the box can pass through voids of the support frame 10. That is, the battery cells can be supported overhead by the support frame.

The battery box 3 is formed with two holes (i.e., a isolated liquid outlet 34 and a isolated liquid inlet 35) at two sides thereof. The isolated liquid outlet 34 and the isolated liquid inlet 35 are connected together via a circulation passage 9 to form a path, and a liquid separation device 4, a circulation pump 8 and a heat exchange device 70 are disposed in the path. The heat exchange device 70 comprising heat dissipating fins 7 (heat exchange fins) and a heat dissipating fan 71. The battery box 3, the liquid separation device 4 and the heat dissipating fins 7 constitute a sealed integral system in which the isolated liquid 2 is circulated. The liquid separation device 4 and a detection device are connected with each other so that the electrolyte leaked from any of the battery cells 1 can be detected while heat is dissipated from the battery pack. In the charging and discharging processes of the battery pack, a site experiencing the highest temperature is electrode tabs or the current collector. Placing the battery cells 1 upside down allows for using as little as possible isolated liquid 2 to achieve the purpose of completely immersing the electrode tabs into the isolated liquid 2, and this can effectively reduce usage of the isolated liquid 2 while still satisfying the heat dissipation requirement.

The isolated liquid with heat energy in the path conducts the heat energy to the heat dissipating fins 7 when passing through the heat dissipating fins 7, and the heat dissipating fan 71 further dissipates the heat energy from the heat dissipating fins 7 to deliver a significant heat dissipation effect. The detection device may comprise at least one detection component 5 disposed at the bottom of the liquid separation device 4, and the detection device further has a reaction device 51 disposed between the liquid separation device 4 and the at least one detection component 5. The liquid separation device 4, the reaction device 51 and the at least one detection component 5 are connected in sequence. This applies to a case where the electrolyte is separated by the liquid separation device 4 and is transferred into the reaction device 51 to chemically react with other substances so that detection is accomplished according to the reaction product. When the electrolyte is leaked from any of the battery cells, the isolated liquid 2 mixed with the leaked electrolyte is detected by the at least one detection component 5 when flowing through the liquid separation device 4, and the at least one detection component 5 gives a feedback signal. The liquid separation device 4 is a device capable of separating the electrolyte from the isolated liquid 2, and is produced according to the principle that the electrolyte has a larger density than the isolated liquid 2 and is insoluble in the isolated liquid 2. The electrical connection components 12 include a relay, a connection copper sheet, a current collector and/or other components for connecting the battery pack. The electrical connection components 12 are soaked in the isolated liquid 2 in order to prevent an electric arc generated during operation of the electrical connection components from igniting flammable components in the box. The at least one detection component 5 is a conductivity sensor, a PH sensor, a fluorion selective electrode or a liquid-level refraction sensor. The liquid separation device 4 separates the electrolyte, and the electrolyte settles down onto the at least one detection component 5 due to the specific gravity thereof. In this embodiment, the at least one detection component 5 is a conductivity sensor. The electrolyte is a good electric conductor and silicone oil is a poor electric conductor, so when the electrolyte leaked is deposited in the liquid separation device 4 with circulation of the silicone oil, a decreased resistance value will be detected by the conductivity sensor. When the resistance value is measured to be smaller than a threshold, an alarm signal is sent by the conductivity sensor to a vehicle control system and is displayed by a display apparatus. Thereby, the driver can be informed, at the first time, of whether there is a problem with the battery so as to carry out maintenance and replacement in time and reduce the possibility of occurrence of risks.

The electrical connection components 12 connected to the battery pack are also fixed inside the battery box 3 and soaked in the isolated liquid 2. The isolated liquid 2 is silicone oil, which is an insulating and fire-retardant liquid having a density of about 0.95 kg/L. The electrolyte has a density of about 1.5 kg/L. The silicone oil and the electrolyte are two kinds of liquids which are insoluble in each other or cannot react with each other.

Embodiment 2

As shown in FIG. 1, a battery box 3 comprising a box body 32 and a cover plate 31. Plate battery units are disposed in the box body 32, and each battery cells 1 is formed by a plurality of the plate batteries that are stacked together. An isolating component 6 is sandwiched between each two adjacent ones of the battery cells 1. In this embodiment, the isolating component 6 is a piece of plastic knitmesh whose longitude lines and latitude lines are not within a same plane, and the plastic knitmesh can isolate the battery cells 1 well and accelerate circulation of a isolated liquid 2 so that an electrolyte can flow into the isolated liquid 2 more easily. A metal knitmesh may also be used as the isolating component 6, but it will affect the insulating capability of the whole system and is prone to be corroded by the electrolyte. Therefore, using the metal knitmesh will deliver a poor effect. It is also possible to use other knitmeshes having an excellent insulating performance. Electrical connection components 12 for connection to an external circuit are placed into the isolated liquid, and all the electrical connection components 12 in the battery pack are soaked in the isolated liquid 2.

The isolated liquid 2 is silicone oil, which is an insulating and fire-retardant liquid having a density of about 0.95 kg/L. The electrolyte has a density of about 1.5 kg/L. The silicone oil and the electrolyte are two kinds of liquids which are insoluble in each other or cannot react with each other.

A support frame 10 is disposed on a surface where electrodes 11 of the battery cells 1 are located, and then the battery cells 1 are placed upside down into the battery box 3. At this point, the electrodes 11 of the battery cells 1 are placed downwards, the support frame 10 supports the whole battery cells 1, and the isolated liquid 2 in the box can pass through voids of the support frame 10.

The battery box 3 is formed with two holes (i.e., a isolated liquid outlet 34 and a isolated liquid inlet 35) at two sides thereof. The isolated liquid outlet 34 and the isolated liquid inlet 35 are connected together via a circulation passage 9 to form a path, and a liquid separation device 4 and a heat exchange device 70 are disposed in the path. The heat exchange device 70 comprising heat dissipating fins 7 and a heat dissipating fan 71. The battery box 3, the liquid separation device 4 and the heat dissipating fins 7 constitute a sealed integral system in which the isolated liquid 2 is circulated.

The isolated liquid with heat energy in the path conducts the heat energy to the heat dissipating fins 7 when passing through the heat dissipating fins 7, and the heat dissipating fan 71 further dissipates the heat energy from the heat dissipating fins 7. The liquid separation device 4 separates the electrolyte according to the principle that the electrolyte has a specific gravity larger than the isolated liquid and is insoluble in the isolated liquid, and the electrolyte that is leaked is finally concentrated in the liquid separation device 4. The electrolyte collected in the liquid separation device 4 is then introduced out and reacts with water. Thereafter, a PH value of the reaction product is detected. If the detection result shows that the reaction product is of acidity, it represents that electrolyte leakage occurs, and this will be displayed by a display apparatus. Thereby, the driver can be informed, at the first time, of whether there is a problem with the battery so as to carry out maintenance and replacement in time and reduce the possibility of occurrence of risks.

The electrical connection components 12 connected to the battery pack are also fixed inside the battery box 3 and soaked in the isolated liquid 2. The isolated liquid 2 is silicone oil, which is an insulating and fire-retardant liquid having a density of about 0.95 kg/L. The electrolyte has a density of about 1.5 kg/L. The silicone oil and the electrolyte are two kinds of liquids which are insoluble in each other or cannot react with each other.

Embodiment 3

Figure 7:
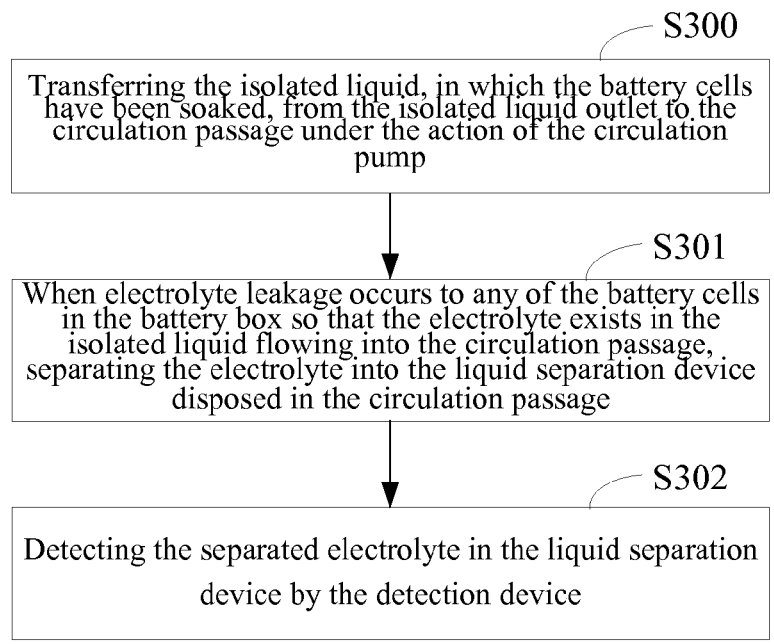
FIG. 7 is a schematic flowchart diagram of a battery pack liquid leakage detection method according to an embodiment of the present disclosure.

Referring to FIG. 7, this embodiment may adopt the battery pack system described in the aforesaid embodiments. A battery pack liquid leakage detection method of this embodiment comprises:

step S300: transferring the isolated liquid, in which the battery cells have been soaked, from the isolated liquid outlet to the circulation passage under the action of the circulation pump;

step S301: when electrolyte leakage occurs to any of the battery cells in the battery box so that the electrolyte exists in the isolated liquid flowing into the circulation passage, separating the electrolyte into the liquid separation device disposed in the circulation passage;

step S302: detecting the separated electrolyte in the liquid separation device by the detection device.

Specifically, the step S302 comprises: detecting the separated electrolyte in the liquid separation device by the detection device, and prompting a driver for maintenance and replacement when a detected resistance value is smaller than a preset threshold due to increase of the concentration of the electrolyte. The value of the preset threshold may be set depending on actual needs, and this can be readily understood by people skilled in the art and thus will not be further defined herein.

For the implementation of the battery pack liquid leakage detection method of this embodiment, please also refer to the related description of the battery pack system in the aforesaid embodiments. This can be readily understood by people skilled in the art and thus will not be further described herein.

We claim:

1. A battery pack system, comprising a plurality of battery cells, an isolated liquid and a battery box containing the isolated liquid, the battery cells being soaked in the isolated liquid, the battery box comprising a box body and a cover plate, and electrical connection components being disposed in the battery pack, wherein the battery cells are placed upside down; the isolated liquid is a fire-retardant and insulating liquid that has a specific gravity smaller than an electrolyte and is insoluble in the electrolyte, the box body is formed with an isolated liquid outlet and an isolated liquid inlet, the isolated liquid outlet is connected together with the isolated liquid inlet via a circulation passage to form a path, a liquid separation device and a circulation pump are further disposed in the circulation passage, the liquid separation device is connected with a detection device, the detection device comprises at least one detection component and a reaction device, the liquid separation device, the reaction device and at least one detection component are connected in sequence; each of the electrical connection components is soaked in the isolated liquid, and the isolated liquid is one or both of silicone oil and transformer oil.

2. The battery pack system of claim 1, wherein a heat exchange device is further disposed in the circulation passage.

3. The battery pack system of claim 1, wherein at least one detection component is one or more of a conductivity sensor, a PH sensor, a fluorion selective electrode and a liquid-level refraction sensor.

4. A battery pack system, comprising a plurality of battery cells, an isolated liquid and a battery box containing the isolated liquid, the battery cells being soaked in the isolated liquid, the battery box comprising a box body and a cover plate, and electrical connection components being disposed in the battery pack, wherein the isolated liquid is a fire-retardant and insulating liquid that has a specific gravity smaller than an electrolyte and is insoluble in the electrolyte, the box body is formed with an isolated liquid outlet and an isolated liquid inlet, the isolated liquid outlet is connected together with the isolated liquid inlet via a circulation passage to form a path, a liquid separation device and a circulation pump are further disposed in the circulation passage, the liquid separation device is connected with a detection device; and the electrical connection components are soaked in the isolated liquid.

5. The battery pack system of claim 4, wherein the detection device comprises at least one detection component.

6. The battery pack system of claim 5, wherein the detection device further comprises a reaction device, and the liquid separation device, the reaction device and the at least one detection component are connected in sequence.

7. The battery pack system of claim 4, wherein a heat exchange device is further disposed in the circulation passage.

8. The battery pack system of claim 4, wherein the isolated liquid is one or both of silicone oil and transformer oil.

9. The battery pack system of claim 4, wherein at least one detection component is one or more of a conductivity sensor, a PH sensor, a fluorion selective electrode and a liquid-level refraction sensor.

10. The battery pack system of claim 4, wherein the battery cells are placed upside down.

11. The battery pack system of claim 4, wherein a bottom surface of each of the battery cells is fixed to the cover plate.

12. The battery pack system of claim 4, wherein a support frame is disposed at the bottom of the battery box to support the battery cells overhead.

13. The battery pack system of claim 11, wherein each of the battery cells comprises a plurality of plate battery units, and an isolating component is disposed between each two of the plate battery units.

14. The battery pack system of claim 13, wherein the isolating component is a knitmesh whose longitude lines and latitude lines are not within a same plane.

15. The battery pack system of claim 1, wherein when the electrolyte is leaked from any of the battery cells, the leaked electrolyte is carried by the isolated liquid to flow from the battery box to the circulation passage, then the leaked electrolyte is separated from the isolated liquid by the liquid separation device, and the leaked electrolyte is detected by the detection device.

16. The battery pack system of claim 4, wherein when the electrolyte is leaked from any of the battery cells, the leaked electrolyte is carried by the isolated liquid to flow from the battery box to the circulation passage, then the leaked electrolyte is separated from the isolated liquid by the liquid separation device, and the leaked electrolyte is detected by the detection device.

* * * * *